(12) United States Patent
Luxem et al.

(10) Patent No.: US 7,084,418 B2
(45) Date of Patent: Aug. 1, 2006

(54) PROCESS AND DEVICE FOR RECOGNITION OF SUBSTRATE STOCK BY MEANS OF LIGHT-SENSITIVE SENSORS

(75) Inventors: Wolfgang Eberhard Luxem, Kiel (DE); Eggert Joachim Jung, Kiel (DE); Thomas Zelenka, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 272 days.

(21) Appl. No.: 10/635,737

(22) Filed: Aug. 6, 2003

(65) Prior Publication Data
US 2004/0065815 A1   Apr. 8, 2004

(30) Foreign Application Priority Data
Aug. 30, 2002   (DE) ................ 102 39 973

(51) Int. Cl.
*G01N 21/86* (2006.01)

(52) U.S. Cl. .................... 250/559.4; 347/105

(58) Field of Classification Search ........... 250/559.39, 250/559.4; 347/14, 105, 106; 271/265.01, 271/265.02, 265.03; 400/708; 399/389
See application file for complete search history.

(56) References Cited

U.S. PATENT DOCUMENTS

| 5,689,425 A | * | 11/1997 | Sainio et al. | 700/124 |
| 5,764,251 A | * | 6/1998 | Hashimoto | 347/16 |
| 5,925,889 A | * | 7/1999 | Guillory et al. | 250/559.16 |

* cited by examiner

*Primary Examiner*—Thanh X. Luu
(74) *Attorney, Agent, or Firm*—Laurence A. Greenberg; Werner H. Stemer; Ralph E. Locher

(57) ABSTRACT

Recognizing a substrate stock by light-sensitive sensors inside a printing unit, by a sensor that can recognize several ranges of light wavelengths. By separate recognition of various ranges of light wavelengths, a substrate stock is recognized whenever the total reflection capabilities of surface and substrate stock determined across all light wavelengths coincide.

5 Claims, 2 Drawing Sheets

PROCESS AND DEVICE FOR RECOGNITION OF SUBSTRATE STOCK BY MEANS OF LIGHT-SENSITIVE SENSORS

FIELD OF THE INVENTION

The invention relates to recognition of a substrate stock in the environment of a light-sensitive sensor within a printing unit.

BACKGROUND OF THE INVENTION

Within a printing unit, the print substrate is moved along a conveyor operation sequence by various transports in order to be supplied to individual stations within the printing unit. Here the substrate stock can then be printed, or other desired processes can be carried out on it. Thus, transport of the substrate stock can take place with or without grippers. Where transport takes place without grippers, e.g. in digital printing units, rollers or belts can be used to hold the substrate stock down and transport it by electrostatic force or through vacuum fixtures.

If a substrate abandons the planned conveyor operation sequence, then it can do damage in other areas of the machine. The danger of such false runs exists particularly in the case of transport without grippers. Therefore, various processes are used to prevent or at least to recognize such false runs promptly so that the machine, or at least the area of the machine where the substrate stock deviates from the planned conveyor sequence, can be stopped before damage occurs. This is especially true for S-shaped substrate stock.

In EP 0 916 602 A 1, comparing the number of substrates fed into the machine with the number recognized by sensors inside the machine, is proposed for recognizing false substrate runs. In that case, sensors are in the environment of the planned conveyor operation sequence. Where the number of substrates sensed inside the machine is too small, it is concluded that there is a false substrate, an alarm is triggered, and appropriate countermeasures are taken. The number of substrates supplied is transmitted by a control signal to a monitoring device planned for that purpose.

If light-sensitive sensors are used to recognize a substrate stock, then substrate stocks can be erroneously identified because of impurities of the transport. It is possible that the absence of substrate stock and therefore a possible false run are not recognized, and damage can occur. Because of impurities, a zone with appropriate change with reference to the reflective action can exist on the surface itself, whereupon a substrate stock can be erroneously identified. In order at least to limit this source of error, the transport must at least be regularly cleaned in order to limit impurities.

With the device above, substrate stocks can be recognized only to the extent that their capacity for reflection, measured by the range of the light wavelength collected by the sensor, differs very distinctly from that of the transport or generally from that of the surface on which the substrate stock is to be recognized. With this device, if the control signal fails, for example, when the machine restarts, then the recognition of false substrates does not operate and it has to be switched off for at least a short period during the re-start. During this time period when the danger exists that unrecognized false substrates could cause damage.

In the German utility model G 82 15 605, a locking device for rotary printing units is presented that can recognize substrate stocks by a light-intensive sensor in the environment of a blanket cylinder. In this connection it is contemplated that a substrate stock, which abandons the planned conveyor operation sequence can be recognized at sites outside the planned conveyor sequence by a light sensitive sensor.

By means of the sensor recommended in G 82 15 605, a false run is recognized in that the reflective capacities of substrate stock and surface of the blanket cylinder can be differentiated within the range of the light wavelength where the sensor is sensitive. The reflected light is measured by the sensor and the presence of a substrate stock can be concluded where there is a sufficient change of reflected luminosity, and appropriate protective measures can be initiated. At this point the total luminosity is measured across the range of the light wavelength measurable by the sensor. This range of light wavelength can typically encompass the total visible spectrum.

If the substrate stock and the blanket cylinder show a similar mean reflective capacity in the range of light wavelength measurable by the sensor, then it is not possible to recognize a difference between the substrate stock and the blanket cylinder. A false run of a substrate stock can reach the area behind the sensor without being detected and cause damage there.

Contamination of the blanket cylinder also represents a source of error. If too much contamination is present on the surface of the cylinder, then it is possible that the difference in the total luminosity measured is sufficient to identify a substrate stock erroneously, and a false alarm will be triggered. Frequent cleaning of the blanket cylinder is therefore also necessary here.

SUMMARY OF THE INVENTION

Therefore, it is the object of the invention to present an improvement in recognizing substrate stocks. The interval between required cleaning intervals should be extended for surface or transport on which a substrate stock is to be recognized. The problem confronting the invention is solved according to the invention in that several ranges of light waves can be recognized by the sensor. The sensor should thus be constructed so that it can measure the luminosity of irradiation in several ranges of light wavelength independently of each other. From the standpoint of technology, the resulting advantage is that substrate stocks and surface can then be differentiated if the total measured luminosity in a single wavelength range, e.g. in the range of visible light, is completely congruent, that is whenever the luminosity absorbed across this range coincides for substrate stock and surface within a range of tolerance. Since, according to the invention, the aggregate measured range of wavelength is subdivided into several ranges, more detailed measures can result by the sensors. As long as the substrate stock and the surface on which it can be recognized show diverging colors, the substrate stock can now be recognized in any case for that reason, since a difference in the luminosity of the light measured by the sensor will be present in at least some ranges of wavelength.

The measuring can take place in such a way that a source of light on one side of the surface on which the substrate stock is to be recognized is held ready, and the sensor is installed on the other side. In this case the transmitted light is measured and thus closed by changes in at least one measured range of wavelength on a substrate stock upon the surface.

A different measurement set-up results whenever sensor and light source are on the same side of the surface. It is then a matter of a measuring method in reflection. In this case the sensor and the light source can be combined with one another in the same station, e.g. in one housing.

It is also possible that a single sensor will be held ready for each range of wavelength. It can also be possible to provide only one sensor, but then to install this one at the edge of the surface on which the substrate stock is to be recognized. In case of a web break, part of the web just separates from its edge; this break can at least be recognized right away.

In an advantageous further development of the invention it is provided that at least one row of sensors will be kept ready across the entire breadth of the surface. Then it is also possible to recognize a substrate stock deviating only partially from the conveyor operation sequence. That can be the case, e.g., whenever a paper path inside a print unit tears away only at the edge. This torn part of the paper path can then wrap around the blanket cylinder, for example. If sensors are now held ready on the entire breadth of this cylinder, then this section of the paper path is recognized, and the machine can be stopped immediately. With this adjustment various sizes of substrate stocks of differing amplitude also can be recognized.

By recognition of several ranges of light wavelength, the need for cleaning surfaces on which substrate stocks are to be recognized is reduced so that the intervals between cleanings also are extended advantageously. A light contamination can still be tolerated since the differences in various ranges of wavelengths can result as being so little that they still can be tolerated, at least within only one range of wavelength. With previous measuring methods within a range of wavelengths the total difference in luminosity already can more likely countervail against letting the substrate stock be considered as recognized. It can thus still be planned advantageously to specify a range of tolerance in each case within which no substrate stock should be reported as recognized, not only for the various ranges of wavelengths alone but also for the deviation within the measured range of wavelengths.

According to the invention it can be planned that the substrate stock should preferably be recognized in areas in which no substrate stock appears during normal operation. Pressure rollers or transfer cylinders can be there, e.g., particularly in the case of offset printing units or digital printing units that use a blanket cylinder when transferring toner onto the substrate stock. With this method it is also possible to demonstrate substrate stock on a printing block or a photoelectric illustrating cylinder. Moreover, the print substrate stock also can be shown on transportation media of various kinds.

The sensor should preferably recognize irradiation in the three ranges of wavelengths that are allocated to red, green, and blue. The sensor is more easily manageable than if even more channels have to be held ready for recognizing colors. Also, it is possible to select from a greater quantity of industrial sensors. Since at least all colors within the RGB color area can be built from the three colors, red, green, and blue, most substrate stocks that do not show the same color as the surface on which they are to be recognized; that is, they differ from the surface in at least one of these three ranges of wavelengths when reflected or transmitted light is measured. The application of more than three channels for measuring color would provide no new information. But a change of measured light luminosity in a range of wavelengths is sufficient to close a substrate stock on the surface. Until now it was possible that a change in luminosity in a partial wave range was counterbalanced by a contrary change of luminosity in another partial wavelength range in such a way that no substrate stock could be recognized. Since now the luminosity is measured in partial ranges independently from one another, changes of luminosity in two different partial wavelength ranges lead directly to even more certain recognition of a substrate stock.

To correspond to the luminosity of the measured light from the ranges of light wavelengths, the place measured by the sensor, be it a substrate stock or another surface, should be assigned a color value within a color area. In this way a value of the recognized color can be allocated, e.g. within the RGB color area. This value can be stored and used further, e.g. to come to a conclusion immediately about a substrate stock on hand or even one that is not on hand based on a known color value of the substrate stock or surface. This procedure should have practical results automatically.

The color values extracted in this way ought beneficially to have a reference value. This reference value should preferably be the color value of the color of the surface on which the substrate sock is to be recognized.

In order that comparison between the reference value and the determined color values is not made more difficult because of diverging specificity from different sensors, it is here planned advantageously that this reference value is also determined with the same sensor with which a substrate is also to be recognized during the operation. Deviations in characteristic features from sensor to sensor thus play no role in determining the reference value. By a direct comparison with a reference value it is possible advantageously to recognize a substrate stock that has already abandoned the conveyor operation sequence even as the machine is restarting with substrate stock.

So that even changes of characteristic features of the sensor and the coloration of the surface do not lead to errors in recognizing substrate stock over time, it is particularly advantageous to update the reference stock frequently. This can be done during a no-load operation of the print unit, that is to say without substrate stock, to determine anew by sensor the corresponding color value of the surface on which the substrate stock is to be recognized. This new color value then replaces the current reference value. To guarantee this updating of the reference value, it is also planned according to the invention that this measurement of the current color value of the surface is to be carried out at every re-start of the machine without a substrate stock.

So that no false substrate is recognized, although none exists, because of minor contamination of the surface or oscillation of luminosity of the light source used or as a consequence of changes of the allotted color value, it is planned, according to the invention, that the deviation ($\Delta E$) of the determined color value of the reference value should exceed a definite threshold value (S) before an alarm is triggered and appropriate measures are taken.

This threshold value S should be chosen insofar as possible so that it is smaller than the distance of the color value of a substrate stock to the reference value. In this way it is guaranteed that a substrate stock on a surface whose coloration corresponds to the reference value also is recognized.

Recognition of the color values preferably should result in reflection. With this measurement method, print units can easily be started up. It is also more frequently applicable since a measure by transmitted light remains limited only to transparent surfaces or means of transport. A further advantage is in the fact that the light source within the sensor, e.g., can be integrated in one housing.

The problem posed is independently resolved according to the invention through a category-appropriate device that is distinguished by the fact that at least one light-sensitive sensor is provided with several channels sensitive for various light wavelengths.

The advantages of a sensor with several channels that are sensitive for various light wavelengths are that the luminosity of radiation provided across an area is drawn on as a measure for appraising the surface. Instead of this it is possible to access the luminosity measured in various ranges of wavelengths. To be sure, this luminosity also is absorbed into the range, but since several ranges are available, the ranges can be valued individually in each case. In that way many channels can be chosen for a sensor so that the resolution of the measurement satisfies the standards. That is, the smaller color differences are to be identified, the more channels can be used for a sensor according to the invention.

It is advantageously planned according to the invention that the color sensor shows at least three channels for measuring in ranges of light wavelengths that preferably correspond to the colors red, green, and blue. Instead of analyzing just one large range of wavelength, based on the measurements in three different smaller ranges of wavelengths, the presence of a substrate stock in the environment of the sensor can be concluded more exactly without having to take into account the disadvantages that arise by mixture of measured radiation luminosity across the range of wavelengths as a whole. Three channels that correspond to the colors red, green, and blue, are entirely sufficient for most of the demands that are placed on this color sensor since an overwhelming number of colors used can be set up on these three colors. Moreover, for most problems it is sufficient to be able to recognize color deviations with the help of these three channels. If a better solution is desired, then, of course, it is possible to access a sensor with an appropriately greater number of channels. Preferably, indeed, only the three channels mentioned are to be used. Then there is additionally the advantage that there exists a rather large quantity of industrial sensors that satisfy these demands.

The presence of a light source is necessary for light in transmission or reflection to be measured with the sensor. Therefore, according to the invention a light source is planned, preferably a white light, in the environment of the sensor. It would be installed in such a way that after a corresponding reflection or transmission through the surface on which the substrate stock is to be recognized, the light should fall overwhelmingly into the sensor.

In this way the surface or the substrate stock absorbs portions of the light blasted onto the surface against the coloration of the surface or a substrate stock, should it be present. Then it can be concluded that the remaining light falls on the sensor and, on the basis of an appropriate analysis on the coloration of the surface onto which the light was cast. Then a substrate stock can be recognized, if it is present. This happens either through recognition of a change in color value or by comparison of the recognized color value with a reference value.

Utilization of a white light source proves advantageous for the reason that generally substrate stocks are used that are colored in the visible spectrum. It is also natural to use a light source that also radiates additionally, or exclusively, in the infrared range. That can also prove to be of advantage if substrate stocks are used whose coloration differed not in the visible range of coloration of the surface on which they are to be recognized, but already in the infrared range. To be sure, an appropriate sensor has to be held ready, too, for utilization of such a light source. This sensor must show either at least an additional channel that is also infrared-sensitive or it should, according to the invention, display several channels for different ranges of infrared with a light source that radiates exclusively in infrared.

By the same token, a UV-light source can be used as well. Similar advantages and conditions are valid for the sensor as with the infrared radiating source, with the additional limitation that special protection has to be held in readiness to protect the eyes of persons using the machine.

In order to be evaluated by luminosity absorbed by the sensor, at least a CPU and a storage medium is required. Across the CPU, a color value is assigned in a color area, e.g. in the RGB-area, to the luminosity measured by the individual channels of the sensor. This value can then be stored occasionally at least in the storage medium. Moreover, a reference value should be stored in the storage medium that preferably should correspond to the color value of the surface on which the substrate stock is to be recognized. By the CPU the allocated color value should then be compared with the reference value. If the difference exceeds a threshold value S, that should also be held ready in the storage medium, then a conclusion can be drawn about a substrate stock.

If the surface within a conveyor operation sequence, if no substrate stock is recognized at a certain point in time then an alarm can be triggered.

So that a substrate can be recognized with certainty, it is further planned that the surface on which the substrate stock is to be recognized should show a coloration whose color value shows at least approximately the threshold value S of possible color values that can be allotted to the coloration of the substrates used. Only then, with a difference $\Delta E$ between the allotted color value and the reference value, can a substrate stock be assumed with certainty to be in the environment of the sensor.

So that a false substrate stock can be independently recognized by a control signal, it is planned that the sensor is held ready advantageously outside the conveyor operation sequence in the environment of the surface. Then a false run can be verified directly every time the sensor recognizes a substrate stock. On the surface, for example, it can be a question of the nip between rubber cloth cylinder and pressure roller, or the turned away surface of a rubber cloth cylinder inside the printing element of a digital printing unit.

It is also possible to show a substrate stock at other places on a printing machine, e.g. it can also be possible to hold a sensor according to the invention ready in the environment of a transport medium in order to recognize there if a substrate stock stops there at a definite time. The recognition of a substrate stock can be compared then with a control signal, and in the case of a control signal that announces a substrate stock while no substrate stock is recognized by the sensor, e.g., a false run can be concluded.

It can also be possible to arrange several sensors over such a breadth of a transport medium that the exact situation at the edges of the substrate stock can be determined. In this way the register accuracy can advantageously be improved in that an incorrect adjustment of a substrate stock can be balanced or the adjustment can even be considered during the during the printing process.

Still other cylinders and rollers of the color works are possible as further favorable places for supplying a sensor according to the invention. In a digital print unit, even the surface of an illustration cylinder can be selected. Also a transfer cylinder other than the blanket cylinder can be chosen as the as observation object.

The invention, and its objects and advantages, will become more apparent in the detailed description of the preferred embodiments presented below.

BRIEF DESCRIPTION OF THE DRAWINGS

Further examples are represented in the illustrations. They also provide further characteristics of the invention that, however, do not limit the invention in its extent. In the detailed description of the preferred embodiments of the invention presented below, reference is made to the accompanying drawings, in which.

DETAILED DESCRIPTION OF THE INVENTION

Figure 1:
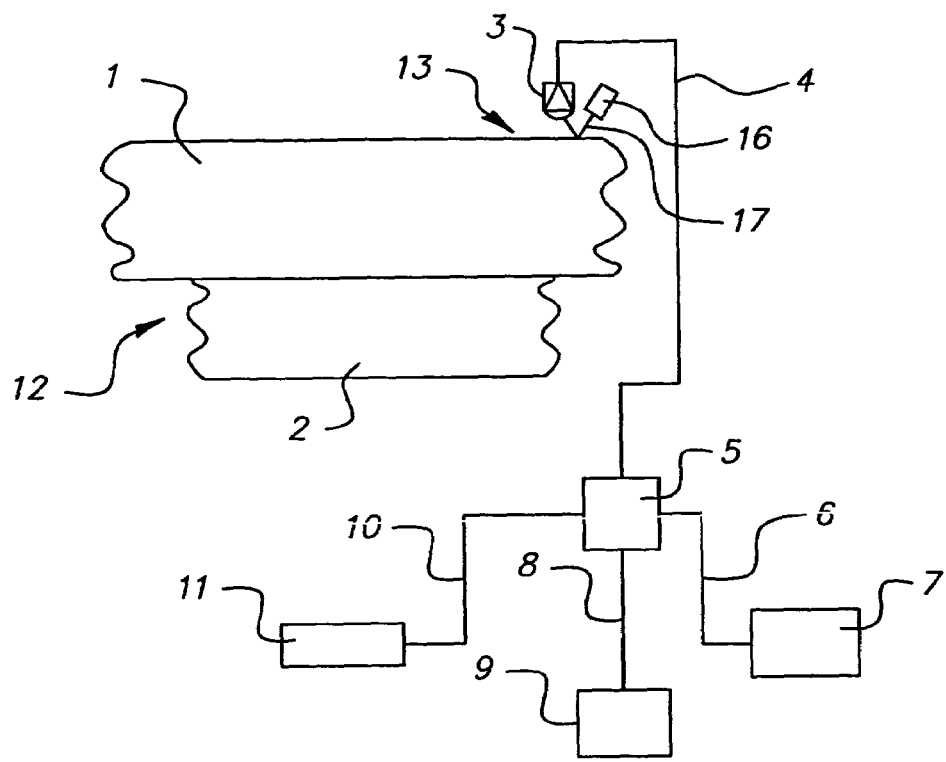
FIG. 1 is a view, in perspective of a sketched overview of an area of a printing machine with a blanket cylinder and a sensor according to the invention.

An area of a printing machine is sketched in FIG. 1, where a light-sensitive sensor 3 with three sensitive color channels is held ready. A view of this area is treated in this description. A blanket cylinder 1 transfers toner that is not shown here, onto a substrate stock 14 (seen in FIG. 2). The transfer of the toner takes place with support of a pressure roller 2 inside a nip 12. The sensor 3 is arranged on the surface of the blanket cylinder 1. A light source 16 emits a ray of light 17. The ray of light 17 is reflected from the surface of the blanket cylinder 1 into the sensor 3. The light source 16 also can be absorbed in a common housing with the sensor 3. The luminosities measured by the sensor 3 in the three ranges of the incident radiation are led over a line 4 to a central computer 5.

The values of luminosity measured can be led over another line 6 to a storage facility 7 where they can be stored for further uses. Thus it can also be planned that in addition a date is assigned to the individual data that makes the date and time of day of the measurement available. If several sensors 3 are used simultaneously, an identification number for the sensor 3 to which these data are assigned can also be set down. Threshold values S could also be set down here, that correspond to an interval ΔE within the color area around which the color value measured by sensor 3 still may deviate from the color value of the blanket cylinder 1 without substrate stock 14 being considered as recognized. These threshold values S can in particular diverse and can be held ready for the different places inside the printing unit at which a substrate stock is to be recognized and, if necessary, in various storage facilities 7 that are assigned to computers 5 within the printing machine. The input of these threshold values can be made manually by an input device that is not shown.

The computer 5 is connected to a database 9 over a line 8. The database 9 makes the color value of the blanket cylinder 1 available. This database 9 can in addition also contain the color values for various cylinders and rollers that are used in the printing machine, or at least those that can be used. In particular, the database 9 can also be connected with several computers 5 (although only one is shown) that are held ready at various places in the printing unit to recognize substrate stocks 14. Here firm threshold values S also can be deposited that correspond to an interval ΔE inside the printing unit around which the color value measured by sensor 3 still may deviate from the color value of the blanket cylinder 1 without substrate stock 13 being considered as recognized. These threshold values S can be diverse and can be deposited in the database 9 in particular for the various places within the printing unit at which a substrate stock 14 is to be recognized.

The computer 5 is connected with a press control 11 over a further line 10. This press control 11 is planned to arrange for appropriate measures to protect the printing unit in case of a recognized false substrate stock. A false substrate stock appears when a substrate stock 14 is recognized by the sensor 3 in the gap 13 between the blanket cylinder 1 and the sensor 3.

Figure 2:
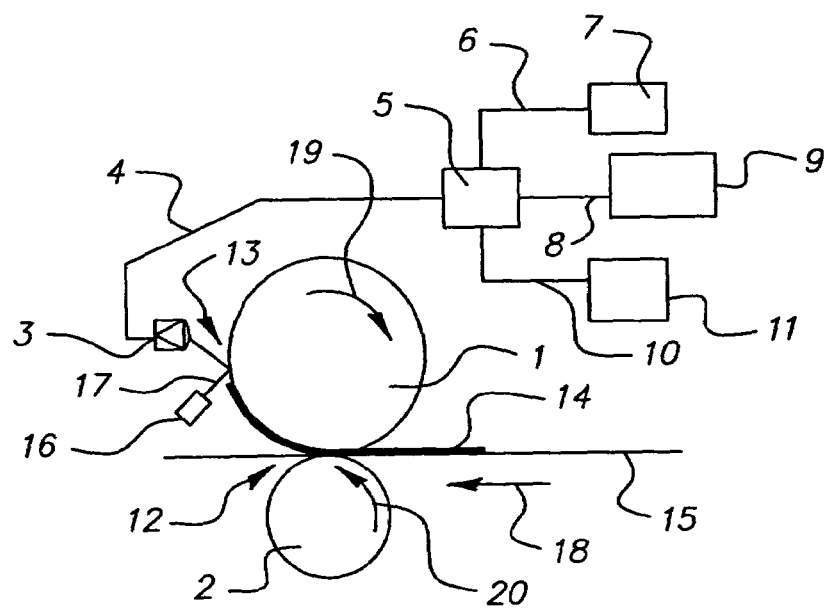
FIG. 2 is a view, in perspective of a sketched cross section of an area of a printing machine with a blanket cylinder and a sensor according to the invention.
Figure 3:
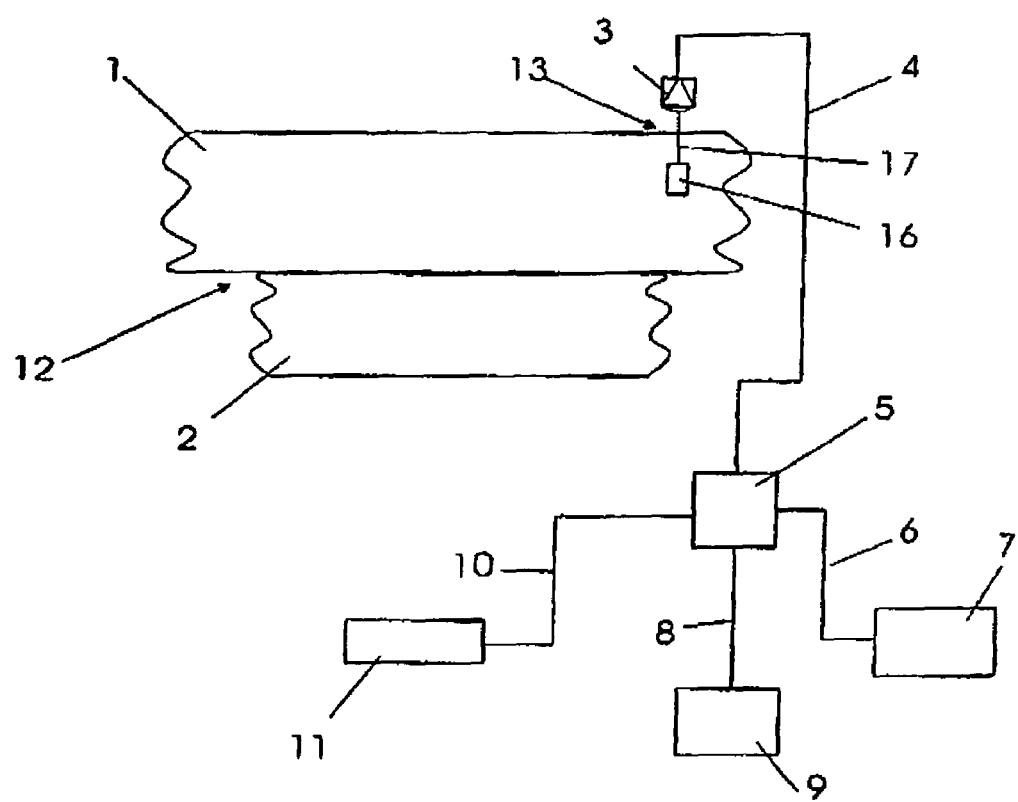
FIG. 3 is a view, in perspective of a sketched overview of an area of a printing machine with a blanket cylinder and a sensor according to another aspect of the invention.

A cross section of a printing machine can be seen in FIG. 2. The same structure represented in FIG. 1 is shown here schematically. Identical reference numbers designate the same elements. In addition to the elements already described, a substrate stock 14 can be seen here on the conveyor belt 15. The substrate stock 14 is conveyed to the conveyor operation sequence in the direction of arrow 18, by this conveyor belt 15. The conveyor belt 15 conveys the substrate stock 14 into the nip 12 between the blanket cylinder 1 and the pressure roller 2. Here there is a transfer of toner from the blanket cylinder 1 to the substrate stock 14.

The blanket cylinder 1 turns in the direction of arrow 19 and the pressure roller 2 turns in the direction of arrow 20. If the substrate stock 14 is conveyed through the nip 12 and afterwards leaves the conveyor operation sequence, it is possible that it arrives in the gap 13. There the substrate stock can be recognized by the sensor 3. The following process is used for surveillance of the blanket cylinder 1 during the ongoing operation of the printing unit. The sense of it is that a false substrate stock that deviates from the intended conveyance route in the direction of arrow 18 will be recognized in the environment of the blanket cylinder 1.

The sensor 3 misses the luminosity of the ray light 17 reflected by the surface of the blanket cylinder 1. The ray of light is emitted by the light source 16. Thereby the measure of luminosity takes place in three different ranges of wavelengths. In this case ranges should be chosen as ranges of wavelengths that can be assigned to the colors red, green, and blue. The luminosities measured by sensor 3 are allocated to these three ranges and transferred to the computer 5 over the line 4. In computer 5, a color value is determined from these three measured values. Here, this color value is within the RGB color area. This color value is transferred over the line 6 to a storage facility 7 and stored there.

Over the line 8, the computer 5 queries the data bank 9 about the color value of the blanket cylinder 1 used. The computer 5 then compares the measured color value with the color value of the database 9. From this comparison a difference ΔE of these color values is determined. Over the line 8, the computer 5 then queries the storage facility 7 about a deposited threshold value S properly at the blanket cylinder 1 used. If there is no value S on deposit, then it can be planned that afterwards the computer 5 queries the database 9 for this threshold value S. In particular, it is also contemplated that the database 9 alone is queried about the threshold value S.

Next, the computer 5 compares the differential ΔE of the color values with the threshold value S. Through this, a subtraction S–ΔE, e.g., can simply take place. If, e.g., the result of this subtraction is negative, then that means that the deviation of the measured color value from the stored color value for the blanket cylinder is large enough so that a false substrate stock can be considered as recognized in the gap 13.

If a false substrate stock is rated as recognized by the computer, then next a message takes place from the computer 5 to press control 11. After receipt of this signal over the line 10, press control 11 can arrange a stop of the printing unit, so that no further damage occurs within the printing machine.

In a further embodiment of the invention it is also possible that the color values of surfaces on which substrate stock 14 is to be recognized are not deposited in the database 9. It is then contemplated according to the invention that these reference values first be determined through a calibration of the device. The calibration occurs automatically, e.g., at every re-start of the printing unit. In this connection, it must be ensured that no substrate stock 14 is inside the machine. At least, no substrate stock 14 may be on a surface on which a substrate stock 14 is to be recognized in sequence.

In the case of a blanket cylinder 1, then, the sensor 3 is arranged on its surface. The ray of light 17 of the light source 16 is then reflected from this surface into the sensor 3. Since no substrate stock 14 is inside the gap 13, the sensor misses only the luminosity of the light reflected from the surface. The three values thus yielded for the colors red, green, and blue are then led over the line 4 to the computer 5. The computer 5 ascertains a color value from these luminosities. In the case of an executed calibration a signal is sent from the press control 11 to the computer 5 over the line 10. In particular this signal contains information that the color value recorded during the period of the calibration corresponds to the color value of the surface of the blanket cylinder 1. The computer 5 assigns a date to the color value ascertained in this way, so that here it deals with the current reference value of the surface of the blanket cylinder 1. An appropriate date is assigned to the color values of other surfaces.

After the measured color value has been recognized as the current reference value of the surface on which a substrate stock 14 is to be recognized, this reference value is transferred with its pertinent date over line 6 to the storage facility 7 by the computer 5. Then this color value is stored there as current reference value for recognizing a substrate stock on that surface. This stored value is called up again by the computer 5 in the normal operation of the printing unit in order to identify a possible substrate stock 14 inside the gap 13 by a comparison of this reference value with the color values just measured.

In ascertaining reference values it can be contemplated in particular that this value is ascertained by an integration of color values measured during calibration over a period of time. Thus, it is possible that the current color value of the surface on which a substrate stock is to be recognized can always be used for comparison. Errors that could be caused by color changes of the surface can be avoided in this way.

The device described, with which the procedures can be carried out, has been described here with substrate stock 14 only for the sake of simplification; the procedures are also possible with other substrate stocks.

The invention has been described in detail with particular reference to certain preferred embodiments thereof, but it will be understood that variations and modifications can be effected within the spirit and scope of the invention.

What is claimed is:

1. A method for recognizing a substrate stock within a printing unit, the method comprising the following steps:
   providing at least one light sensitive sensor, the at least one light sensitive sensor being attached to the printing unit and being able to independently sense several partial ranges of light wavelengths;
   providing a light-emitting light source, light emitted from the light-emitting light source being reflected by or transmitted through a surface and/or a substrate stock on the surface in the printing unit;
   sensing several partial ranges of light wavelengths of the reflected or transmitted light with the at least one light sensitive sensor and measuring the luminosity of these ranges of light wavelengths;
   automatically assigning the measured luminosity of the several partial ranges of light wavelengths a color value within a color area, and comparing the color value with a reference color value and recognizing a substrate stock if the compared color value differs; and
   ascertaining the reference color value by the sensor through a measurement of the light reflected by or transmitted through the surface on which the substrate stock is to be recognized.

2. A method for recognizing a substrate stock within a printing unit, the method comprising the following steps:
   providing at least one light sensitive sensor, the at least one light sensitive sensor being attached to the printing unit and being able to independently sense several partial ranges of light wavelengths;
   providing a light-emitting light source, light emitted from the light-emitting light source being reflected by or transmitted through a surface and/or a substrate stock on the surface in the printing unit;
   sensing several partial ranges of light wavelengths of the reflected or transmitted light with the at least one light sensitive sensor and measuring the luminosity of these ranges of light wavelengths;
   automatically assigning the measured luminosity of the several partial ranges of light wavelengths a color value within a color area and comparing the color value with a reference color value; and
   determining a deviation of the assigned color value from the reference value and recognizing a substrate stock if the deviation exceeds a previously determined threshold value.

3. The method according to claim 2, which further comprises stopping at least an affected area of the printing unit and/or triggering an alarm whenever the deviation exceeds the previously determined threshold value.

4. A device for recognizing a substrate stock on a surface in a printing unit, the device comprising:
   at least one light sensitive sensor, said at least one light sensitive sensor being attached to the printing unit for independently sensing several partial ranges of light wavelengths;
   a light-emitting light source, light emitted from said light-emitting light source being reflected by or transmitted through a surface and/or a substrate stock on said surface in the printing unit;
   a device for comparing a luminosity value of at least one range out of several ranges of light wavelengths with a reference value and recognizing said substrate stock on said surface if compared values differ at least for one range of light wavelengths; and
   a device for triggering an alarm and/or stopping at least an affected area of the printing unit if a substrate stock is recognized on said surface, said surface showing a color value deviating from all colors that the printing unit can produce with printing inks.

5. The device according to claim 4, wherein said surface on which said substrate stock is to be recognized is outside a conveyance sequence for said substrate stock.

* * * * *